(12) United States Patent
Borchers (10) Patent No.: US 7,831,195 B2
(45) Date of Patent: Nov. 9, 2010

(54) INTEGRATED PAPER AND COMPUTER-BASED TESTING ADMINISTRATION SYSTEM

(75) Inventor: Gregory Eugene Borchers, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 149 days.

(21) Appl. No.: 11/609,305

(22) Filed: Dec. 11, 2006

(65) Prior Publication Data

US 2008/0140865 A1 Jun. 12, 2008

(51) Int. Cl.
*G09B 3/00* (2006.01)

(52) U.S. Cl. .................. 434/350; 434/118; 434/322; 434/362; 434/353; 434/323; 434/327; 434/361; 271/278; 271/288; 271/289

(58) Field of Classification Search .............. 434/350, 434/118, 322, 323, 362, 353, 327, 361; 271/278, 271/288, 289
See application file for complete search history.

(56) References Cited

U.S. PATENT DOCUMENTS

| | | | | |
|---|---|---|---|---|
| 4,037,780 | A * | 7/1977 | Brownlee et al. | 232/31 |
| 5,085,587 | A | 2/1992 | DesForges et al. | |
| 5,513,994 | A | 5/1996 | Kershaw et al. | |
| 5,565,316 | A * | 10/1996 | Kershaw et al. | 434/322 |
| 5,813,009 | A * | 9/1998 | Johnson et al. | 707/100 |
| 5,827,070 | A | 10/1998 | Kershaw et al. | |
| 5,947,747 | A * | 9/1999 | Walker et al. | 434/354 |
| 5,987,302 | A * | 11/1999 | Driscoll et al. | 434/353 |
| 6,042,384 | A | 3/2000 | Loiacono | |
| 6,178,308 | B1 | 1/2001 | Bobrow et al. | |
| 6,311,040 | B1 | 10/2001 | Kucinski et al. | |
| 6,526,258 | B2 | 2/2003 | Bejar et al. | |
| 6,633,223 | B1 * | 10/2003 | Schenker et al. | 340/5.53 |
| 6,749,434 | B2 | 6/2004 | Stuppy et al. | |
| 6,948,153 | B2 | 9/2005 | Bowers | |
| 6,951,303 | B2 | 10/2005 | Petersen et al. | |
| 6,966,048 | B2 | 11/2005 | Bowers | |
| 7,551,300 | B2 * | 6/2009 | Wolfman et al. | 358/1.14 |
| 2003/0129573 | A1 | 7/2003 | Bowers | |
| 2003/0138765 | A1 | 7/2003 | Bowers | |
| 2003/0182602 | A1 | 9/2003 | Bowers | |
| 2003/0196170 | A1 | 10/2003 | Bowers | |
| 2003/0203342 | A1 | 10/2003 | Bowers | |
| 2004/0086841 | A1 * | 5/2004 | Clark et al. | 434/350 |
| 2004/0091847 | A1 * | 5/2004 | Creamer | 434/353 |
| 2004/0185424 | A1 * | 9/2004 | Kucinski et al. | 434/359 |
| 2004/0259067 | A1 * | 12/2004 | Cody et al. | 434/323 |
| 2006/0003306 | A1 * | 1/2006 | McGinley et al. | 434/350 |
| 2006/0154227 | A1 | 7/2006 | Rossi et al. | |
| 2006/0220308 | A1 * | 10/2006 | Schaefer et al. | 271/298 |
| 2006/0256364 | A1 * | 11/2006 | Yamamoto | 358/1.14 |

* cited by examiner

FOREIGN PATENT DOCUMENTS

WO WO2005114614 12/2005

*Primary Examiner*—Xuan M Thai
*Assistant Examiner*—Jack Yip
(74) *Attorney, Agent, or Firm*—Stolowitz Ford Cowger LLP (57) ABSTRACT

An improved system for administering a computer and paper-based test, including a multifunction peripheral having a printing function and a scanning function for operating on the test, and a host remotely connected to the peripheral over a network. The multifunction peripheral is configured to receive the test from the host and transmit a scanned copy of a modified paper test to the host, and the host is configured to transmit a result of an evaluation of the modified test to the peripheral. A method for administering a test including transmitting a registration code, receiving a print job including a test associated with the registration code and printing the test. The method further includes digitizing the test and transmitting the digitized test.

13 Claims, 4 Drawing Sheets

INTEGRATED PAPER AND COMPUTER-BASED TESTING ADMINISTRATION SYSTEM

BACKGROUND

The invention relates to a test administration system that integrates paper and computer-based testing processes.

Conventional testing systems may be computer-based or paper-based. In some conventional computer-based testing systems, a host computer is networked to one or more clients. A test taker sits in front of the client and interacts through a series of question and answer sessions. The host manages the questions and answers that are displayed for the test taker via the client. Multiple test takers may take the test concurrently or at different times by using one or more clients. The question and answer sessions are accomplished electronically, where the test taker reads a question on a monitor of the client, and enters an answer by means of a mouse or keyboard stroke. The answer is transmitted to the host computer and compared with the correct response. The entire testing sequence takes place through electronic interactions between the host computer and the client.

Many test takers prefer a paper-based testing format. Test takers may be uncomfortable with computer based technology, or may simply be more familiar or comfortable with a tangible, paper medium. For example, a paper-based test provides the test take a means of writing notes, making corrections to answers prior to submitting a response, referring to previous questions, or skipping ahead to different questions or sections in the test. Due to administrative and security concerns, paper-based testing systems can often be more expensive than computer-based testing systems. Paper-based tests may be lost or destroyed, for example during transport to a central testing facility that may evaluate the tests. The tests may be subject to unauthorized removal from a testing location. Paper-based tests are typically provided to large groups of people in a limited time and location in order to increase security of the test material.

The present invention addresses these and other problems associated with the prior art.

SUMMARY OF THE INVENTION

An improved system for administering a computer and paper-based test, including a multifunction peripheral having a printing function and a scanning function for operating on the test, and a host remotely connected to the peripheral over a network. The multifunction peripheral is configured to receive the test from the host and transmit a scanned copy of a modified paper test to the host, and the host is configured to transmit a result of an evaluation of the modified test to the peripheral.

A method for administering a test including transmitting a registration code, receiving a print job including a test associated with the registration code and printing the test. The method further includes digitizing the test and transmitting the digitized test.

The invention will become more readily apparent from the following detailed description of a preferred embodiment of the invention which proceeds with reference to the accompanying drawings.

DESCRIPTION OF EXAMPLE EMBODIMENTS

Improvements to computer-based systems have occurred over recent years in order to increase test taker comfort levels and provide more intuitive features. Many test takers find, however, that despite these improvements a testing session on a computer-based test system does not provide an experience that is as satisfactory as a paper-based test system. Test providers, on the other hand, may be driven to implement a computer based system that is at odds with the preference for a paper-based system. For example, the administration and security of the testing information and materials associated with a paper-based system may result in an increased cost to the test provider. Integrating a paper-based test system with a computer-based test system provides a secure, flexible and user-friendly testing environment.

Figure 1:
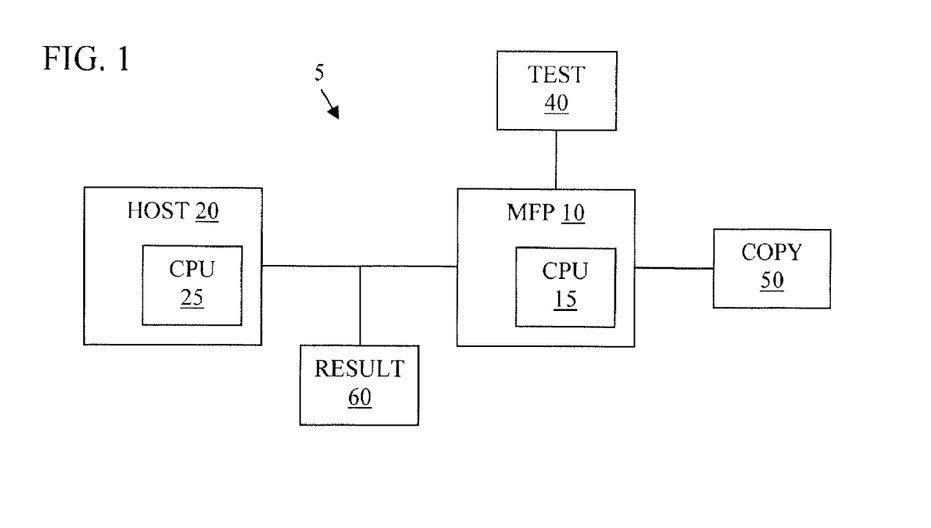
FIG. 1 illustrates an example block diagram of an integrated paper and computer-based testing system, including a host computer and a multifunction peripheral.

FIG. 1 illustrates an example block diagram of an integrated paper and computer-based testing system 5, including a multifunction peripheral 10 and a host computer 20. The host 20 may include a processor 25 to run one or more operations or applications that help manage the testing system. Similarly, the peripheral 10 may include a processor 15 to help run and control other functions or applications associated with the testing system 5.

A test taker or user may need to take a test. The test taker may therefore go to a testing center which includes a peripheral 10. The peripheral 10 may include functions or applications that provide for printing, scanning, digitizing or photographing. In one embodiment, the peripheral 10 may be connected to a device which provides these functions or applications. The peripheral 10 or the device may include a scanner, photocopier, camera, fax machine or other apparatus that is configured to digitize an image or otherwise convert an optical signal into data.

At the testing center, the test taker receives a test 40. The test 40 is provided on a piece of paper or some other tangible medium that the test taker can write on. The test 40 therefore includes questions to which the test taker is to provide answers. The answers may be provided by filling in bubbles, writing a numerical answer, providing an analytical solution, or writing an essay, for example. The answers may be provided on the same paper or tangible medium that the questions are provided on. The test 40 may therefore include both the questions and the answers provided by the test taker. Including the answers on the test 40 minimizes user error that may occur when the test taker enters an answer in a field of an answer page that associated with a different question on the question page. Many test takers have experienced entering an answer on the wrong line of the answer page, which requires correction of the answer and possibly subsequent answers that are similarly off by one line or answer number.

As previously discussed, the multifunction peripheral 10 includes a scanning function for operating on the test 40. When the test taker has completed taking the test 40, the test 40 is scanned, photographed or otherwise digitized by the peripheral 10 or by the device in communication with the peripheral 10. The operation of scanning, photographing or digitizing an image is referred to as scanning hereafter, for convenience.

The peripheral 10 is connected to the host 20. The peripheral 10 may be remotely connected to the host 20, for example through a wide area network or over the Internet. The peripheral 10 may also be connected to the host 20 through an Intranet, a local area network, a virtual local area network, or any other means of communicating in a host and client system known in the art. A copy of the scanned test 50 is transmitted from the peripheral 10 to the host 20. The scanned test 50 may include both the questions and the answers provided by the test taker.

Upon receipt of the scanned test 50, the host 20 may evaluate the scanned test 50, or transmit the scanned test 50 to a test evaluation center, for example. In one embodiment, the host 20 is able to utilize optical character recognition (OCR) to evaluate the scanned test 50. OCR may evaluate an image and translate it into computer recognizable font. After the scanned test 50 has been evaluated or graded, the host 20 is configured to transmit a result 60 of the evaluation to the peripheral 10. The result 60 may then be printed out or displayed to the test taker or test center personnel for review. In one embodiment, the result 60 is included in an e-mail to the test center or to the test taker.

Whereas the test 40 is provided on paper or otherwise tangible medium, the scanned test 50 and the result 60 are transmitted between the peripheral 10 and the host 20 electronically. In one embodiment, the peripheral 10 prints out the result 60 on paper or some other tangible medium after it receives it as an electronic file or other type of data. The peripheral 10 may therefore serve as both an on-ramp and an off-ramp for an interface between paper-based and computer-based testing processes.

Additional functions may be provided by the peripheral 10 and host 20 other than those discussed so far. For example, the test taker may first be required to submit some type of identification to verify their identity. In one embodiment, the peripheral 10 scans an identification card, such as a driver's license, of the test taker and transmits the scanned image to the host 20 for authentication. The peripheral 10 could similarly transmit a finger print, hand print, retinal scan, or voice signal of the test taker to the host 20 for authentication of the test taker's identity. In yet other embodiments, transmissions between the peripheral 10 and the host 20 may be encrypted or provided as secure print data stream to maintain security and privacy of the data. The print data stream may be encrypted.

Figure 2:
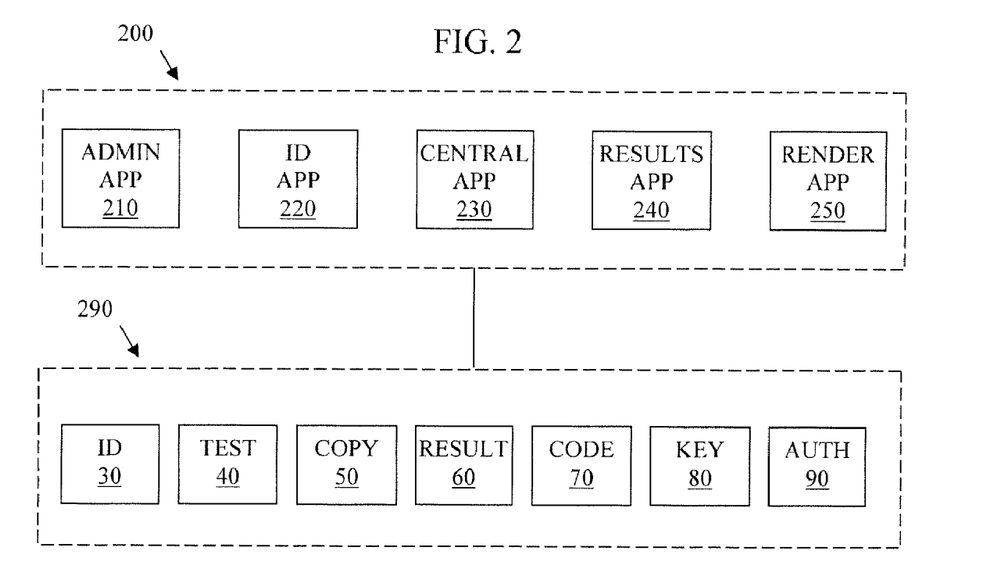
FIG. 2 illustrates an example block diagram of applications and information that may be utilized by the testing system of FIG. 1.

FIG. 2 illustrates an example block diagram of applications 200 and test information 290 that may be utilized by the testing system 5 of FIG. 1. The applications 200 may be performed by one or both of the processors 15 and 25 associated with the peripheral 10 and host 20 in FIG. 1. Applications 200 may include an administrative application 210, an identification application 220, a central application 230, a results application 240 and a rendering application 250. The applications 200 are shown separated according to their respective functions, however it should be understood that there may not be any physical or distinct separation between processors or software modules that perform these applications.

The administrative application 210 may include a test administration application 210 that controls identification and registration functions. The administrative application 210 may manage or control functions associated with scanning the test 40 or scanning a user identification 30 associated with the test taker. In one embodiment, the administrative application 210 manages or controls the printing of the test 40 or the result 60. The administrative application 210 may also manage the receipt and release of print jobs that include the test 40 or the result 60. The test 40 may be printed on demand at a test center. In one embodiment, the administrative application 210 is performed by the processor 15 of FIG. 1, and the user identification 30 is transmitted from the peripheral 10 to the host 20 in FIG. 1.

The identification application 220 analyzes and authenticates the user identification 30 during a registration process. The registration process may occur prior to an administration of the test 40. In one embodiment the identification application 220 utilizes OCR or other recognition software or devices to evaluate the user identification. If the user identification 30 is authenticated, an authentication message 90 may be generated by the identification application 220. The authentication message 90 may be provided from the identification application 220 to the administrative application 210. In one embodiment, the identification application 220 is performed by the processor 25 of FIG. 1 and the authentication message 90 is transmitted from the host 20 to the peripheral 10. The user identification 30 may include a scanned identification card or an identifying characteristic of the test taker, such as a finger print, hand print, retinal scan, voice scan, etc.

The central application 230 manages one or more of the applications 200 of the testing system 5. Depending on the type of scanned test 50 that is transmitted to the host 20, the central application 230 may determine to instruct the results application 240 to evaluate the scanned test 50, or it may elect to forward the scanned test 50 to a central testing facility or other location for evaluation. For example, if the scanned test 50 includes essays or analytical solutions, the central application 230 may determine that the test should be evaluated or graded manually by a person. The central application 230 may therefore operate as a gateway between the testing system 5 of FIG. 1 and the central testing facility or a test provider that develops content for the test 40. Tests that are suitable for OCR or automated evaluation may be provided to the results application 240. In one embodiment, the central application 230 is performed by the processor 25 of FIG. 1. In another embodiment, the central application 230 evaluates the scanned test 50.

The results application 240 evaluates the scanned test 50 and determines the result 60 based on answers provided in the scanned test 50. The answers may be compared to an answer key accessible from memory or a table, for example. In one embodiment, the results application 250 is performed by the processor 25 of FIG. 1.

The rendering application 250 renders the result 60 that are transmitted to the peripheral 10 in FIG. 1. Similarly, the rendering application 250 may render the test 40 and provide the test 40 to the administrative application 210 for printing on paper or another tangible medium. The rendering application 250 may render the test 40 or the result 60 in a print job that is encrypted or provided as a secure print data stream. In one embodiment, the test 40 and result 60 are printed by the peripheral 10 or by a printing device connected to the peripheral 10. In one embodiment, the rendering application 250 is performed by the processor 25 of FIG. 1.

The test 40 and result 60 may be printed after a secure key 80 is provided, to restrict access and maintain security of the testing process. The secure key 80 may be provided by the administrative application 210 or by the peripheral 10, for example. The secure key 80 may be known only to the host 20 and the peripheral 10 to limit access to the data associated with the test 40 and result 60. The test 40 and result 60 may be included in one or more print jobs. The test 40 and result 60 may be printed after the secure key 80 is provided, after which the print job is released. The secure key 80 may provide for printing only a single copy of the print job.

In another embodiment, the administrative application 210 may provide a registration code 70 to the rendering application 250 after the identification application 220 provides the authentication message 90. The registration code 70 may identify the test taker, the test 40, or the test center, for example. The registration code 70 may be used by the rendering application 250 to determine which test to render. The administrative application 210 may also provide the registration code 70 to the central application 250 when the scanned test 50 is transmitted to the host 20 of FIG. 1. The central application 250 may use the registration code 70 to determine whether to send the scanned test to the results application 240 or the central testing facility, for example. The registration code 70 may be included with the scanned test 50 as a tag or label.

In yet another embodiment, the peripheral 10 includes a holding device capable of holding the test 40 while the scanned test 50 is being processed by the central application 230. After the result 60 is transmitted to the peripheral 10, the result 60 may be compared with the scanned test 50 or the original test 40. After the result 60 is verified, visually by test personnel or automatically by the administrative application 210, the test 40 may be destroyed. The holding device of the peripheral 10 may include a shredder, for example.

The test 40 may therefore be printed and consumed locally at the test center, such that the test 40 never physically leaves the test center. Security may be improved by maintaining both the printed version of the test 40 as well as the electronic copy of the scanned test 50 during test evaluation, reporting and validation. The host 20 of FIG. 1 may only need to be in communication with the peripheral 10 during the identification, authentication, rendering and results operations. The host 20 and the peripheral 10 may not need to communicate while the test taker is taking the test 40.

Figure 3:
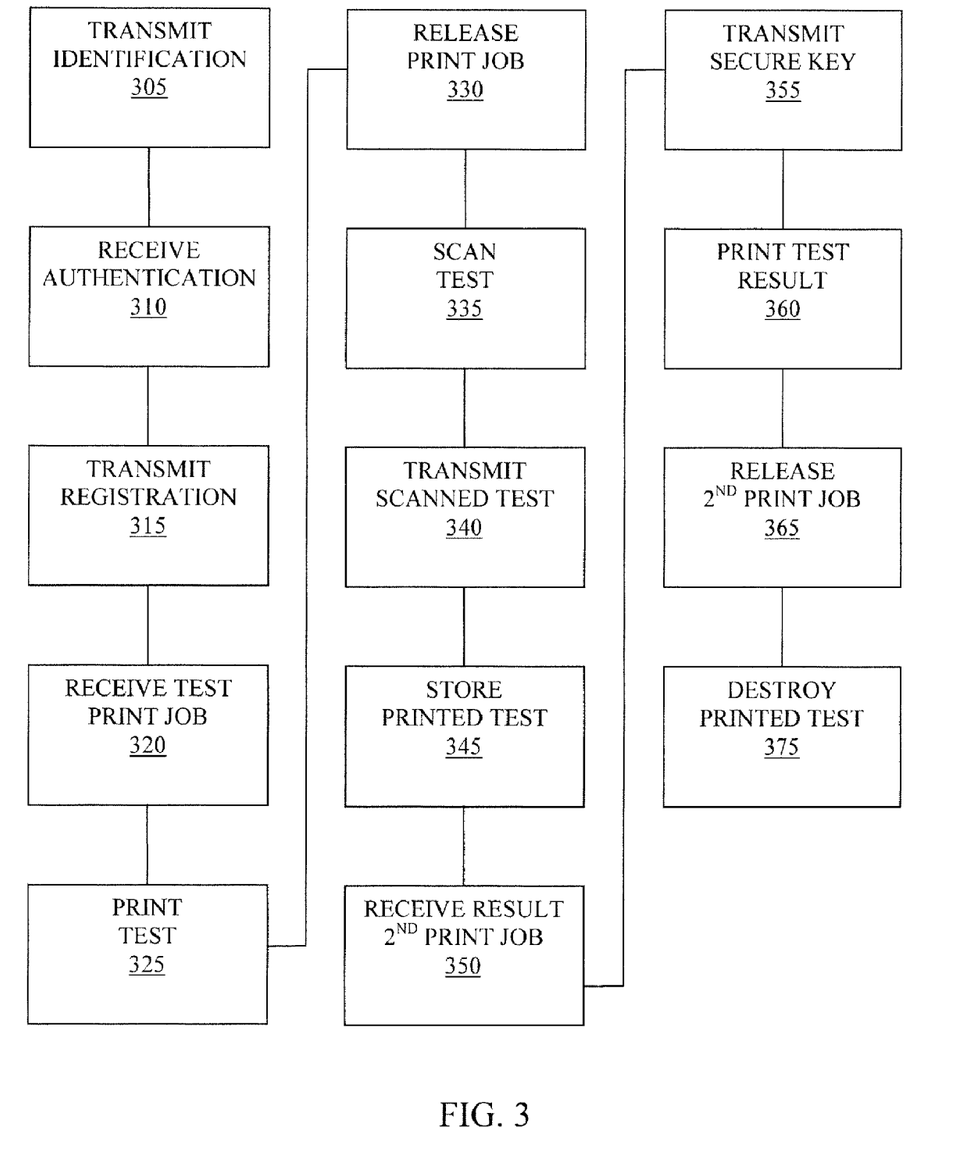
FIG. 3 illustrates an example method of operating an integrated paper and computer-based testing system.

FIG. 3 illustrates an example method of operating an integrated paper and computer-based testing system. The method may be operated on by the applications described with reference to FIG. 2, as well as the devices and apparatus of FIG. 1. In one embodiment, the method is executed by a processor such as processor 15 of peripheral 10 in FIG. 1

At operation 305, an identification such as user identification 30 of a test taker is transmitted. The user identification 30 may be transmitted to host 20 of FIG. 1, for example. The user identification 30 may include an identification card, such as a driver's license, of the test taker. The user identification 30 may further include a finger print, hand print, biometric identification, or other identification that may uniquely identify the test taker. The user identification 30 may be scanned or digitized prior to transmission.

At operation 310, an authentication acknowledgement is received. The authentication acknowledgement may serve as an authentication handshake, both acknowledging the user identification 30 and acknowledging a successful communication session. The communication session may occur between the host 20 and the peripheral 10.

At operation 315, a registration code associated with a test, such as test 40, is transmitted. The registration code may include registration code 70 of FIG. 2. The registration code 70 may identify both the test 40 and the test taker as indicated in the user identification 30, as well as the test center. In one embodiment the registration code 70 is transmitted to the host 20 of FIG. 1

At operation 320, a print job including a test, such as test 40, is received. The print job and test 40 may be encrypted or provided as a secure print data stream. At operation 325, the test 40 is printed. In one embodiment, a secure key 80 is entered or provided before the test 40 will print. In one embodiment, the peripheral 10 of FIG. 1 prints the test 40. In another embodiment, the peripheral 10 is connected to a printing device which prints the test 40.

At operation 330, the print job including test 40 is released. In one embodiment, the print job may only be printed one time. The test 40 may be reprinted if another print job including test 40 is received. The secure key 80 or a different secure key may be entered or provided before the test 40 is reprinted.

At operation 335, a test is scanned. The test may include test 40, which may further include answers provided by the test taker. The answers may include written or constructed responses. The constructed response may include analytical solutions or essays, as distinguished from simple multiple choice responses. A scanned copy of the test 40 may be created by digitizing an image of the test 40. The scanned copy may include scanned test 50, for example. Scanned test 50 may be created by scanning photographing, copying or digitizing the test 40. In one embodiment, the peripheral 10 of FIG. 1 scans, photographs, copies or digitizes the test 40 to generate the scanned test 50. In another embodiment, a scanner, camera, fax machine or copy machine is connected to the peripheral 10 for generating the scanned test 50.

At operation 340, the scanned test 50 is transmitted. In one embodiment, a registration code, such as registration code 70 associated with the scanned test 50 is also transmitted. The scanned test 50 and the registration code 70 may be transmitted together or in sequence. The registration code 70 may serve to identify the scanned test 50, the test taker or the testing center. The registration code 70 may be entered by a test center staff, or may be included on or with the scanned test 50.

At operation 345, a printed test is stored. The printed test may include test 40 further including answers provided by the test taker. The test 40 may be stored in a secure document output chamber that is locked and physically secure.

At operation 350 a second print job including a test result is received. The test result may include result 60 of FIG. 1 and be provided in an electronic file. The second print job including result 60 may be encrypted or provided as a secure print data stream. At operation 355, a secure key is entered or provided. In one embodiment the secure key 80 is entered or provided before the result 60 will print.

At operation 360, the result 60 is printed. In one embodiment, the peripheral 10 of FIG. 1 prints the result 60. In another embodiment, the peripheral 10 is connected to a printing device which prints the result 60. The result 60 may be provided to the test taker.

At operation 365, the second print job including result 60 is released. In one embodiment, the second print job may only be printed one time. The result 60 may be reprinted if another print job including result 60 is received. The secure key 80 or a different secure key may be entered or provided before the result 60 is reprinted.

At operation 375, the printed test is destroyed. The printed test may include the test 40 that is stored in the secure document output chamber at operation 340. The test 40 may be destroyed after the result 60 is printed, scored and reported to the test taker. In one embodiment, the document output chamber is included as part of or connected to the peripheral 10 of FIG. 1. The document output chamber may include a shredder for shredding the test 40. The result 60 may first be compared to the test 40 in the document output chamber prior to destroying the test 40. If any discrepancy between the result 60 and the test 40 is found, then the test 40 may be retrieved from the document output chamber for further review or be rescanned and retransmitted for further evaluation.

Figure 4:
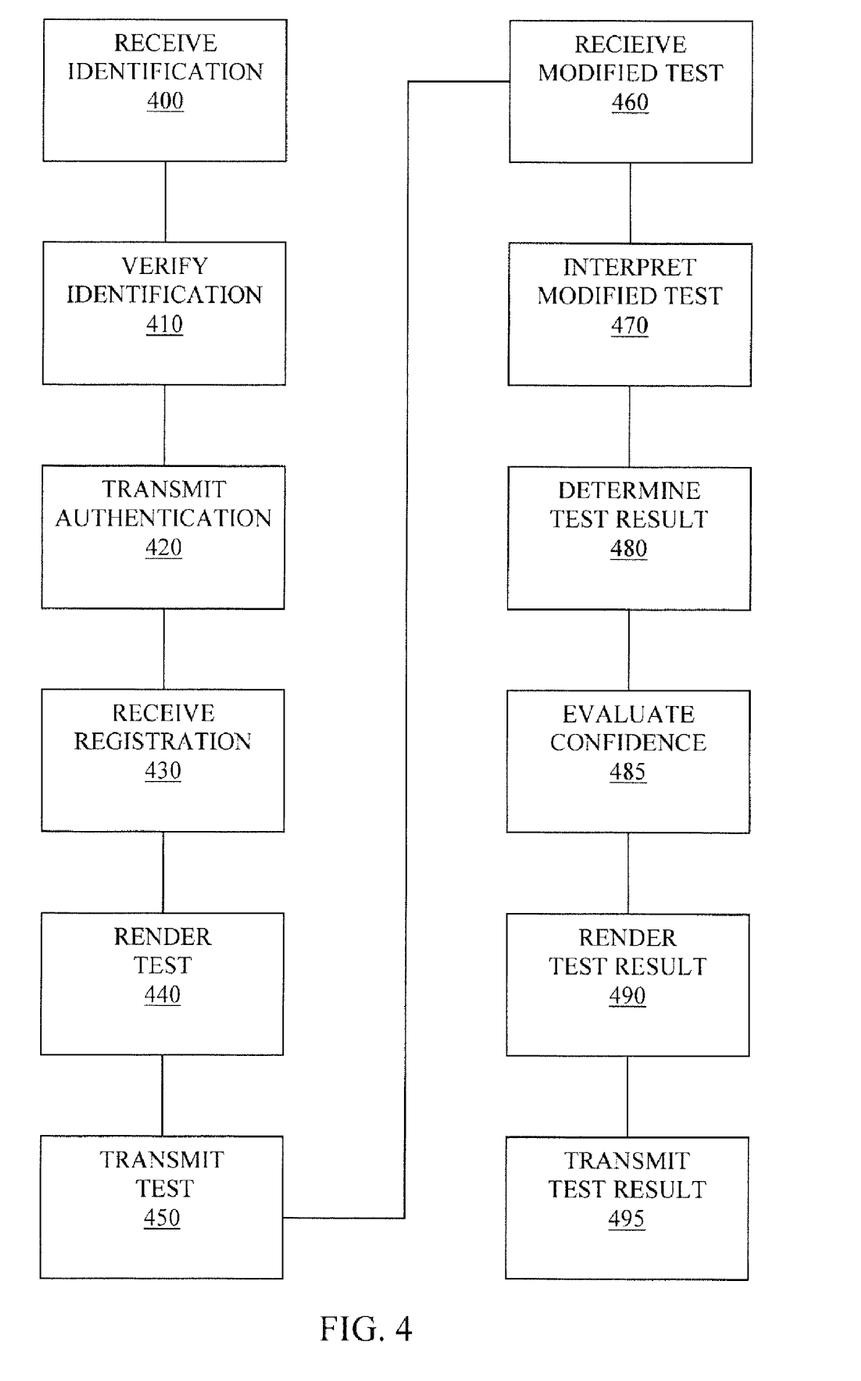
FIG. 4 illustrates an example method of managing a testing system as further described herein.

FIG. 4 illustrates an example method of managing a testing system. The method may be included as logic encoded in one or more tangible media for execution. The method may be operated by the applications described with reference to FIG. 2, as well as the devices and apparatus of FIG. 1. In one embodiment, the logic is executed by a processor such as processor 25 of the host 20 in FIG. 1.

At operation 400, an identification of a test taker is received. The identification may include the user identification 30 of FIG. 2 and as further described with reference to operation 305. At operation 410, the user identification 30 is verified. This may be accomplished through a combination of human interpretation and OCR, for example.

At operation 420, an authentication acknowledgment is transmitted. The authentication acknowledgment may serve as an authentication handshake, for example as between the host 20 and the peripheral 10.

At operation 430, a registration code associated with a test, such as test 40, is received. The registration code may include registration code 70 of FIG. 2 and as further described with reference to operation 315. At operation 440, a file including the test 40 is rendered. The file may be an electronic file including a print job. The print job may be rendered using encrypted data or using a secure print data stream.

At operation 460, a modified test is received. The modified test may be identified by the registration code 70. The modified test may include scanned test 50 of FIG. 1 and may further include answers provided by the test taker. The scanned test 50 may be received in an encrypted or secure format.

At operation 470, the scanned test 50 is interpreted. The interpretation may be performed by an OCR test scoring algorithm, for example. A scanned test that includes written essays or solutions may be retransmitted to a central testing facility to be evaluated or scored manually. The scanned test 50 may therefore be evaluated automatically by a processor, such as processor 25 of FIG. 1, manually by a person, or by a combination of both. At operation 480, a test result is determined. The test result may include result 60 of FIG. 2.

At operation 480, a confidence in the test result 60 is evaluated. The confidence may be evaluated in terms of the ability to accurately evaluate a transmission quality of the data received in the form of the scanned test 50 of FIG. 1. For example, the scanned test 50 may include data that is not clear or has poor image quality. Confidence may be evaluated by comparing a data size of the scanned test 50. Confidence in the test result 60 may also be evaluated according to an accuracy of the test taker in darkening an answer circle.

At operation 490, a second file including the test result 60 is rendered. The second print job including result 60 may be encrypted or rendered as a secure print data stream. At operation 495, the result 60 is transmitted. For example, the result 60 may be transmitted to a remote device, such as peripheral 10, for subsequent review or printing.

Figure 5:
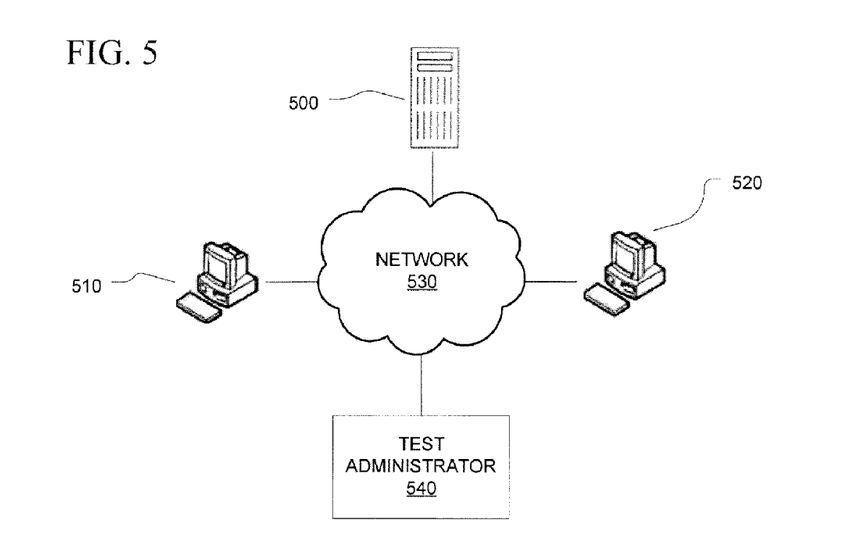
FIG. 5 illustrates an example system diagram of a testing system operating over a network.

FIG. 5 illustrates an example system diagram of a testing system operating over a network 530. The system includes a server 500, two endpoints 510, 520 and a test administrator 540. Network 530 may include the Internet, a local area network, a virtual local area network, an intranet, a wide area network, or any other network known in the art.

Server 500 may provide one or more operations or applications that help manage the testing system. Server 500 may be in communication with endpoint 510 or endpoint 520 over the network 530, during a testing session. Server 500 may operate the same or similarly as host 20 of FIG. 1.

Endpoint 510 may be located at a different physical location from endpoint 520. In one embodiment, endpoint 510 is located at a first test center and endpoint 520 is located at a second test center. Both endpoints 510, 520 may be located remotely from the server 500 in separate locations, cities, states or countries. Endpoints 510, 520 may operate the same or similarly as peripheral 10 of FIG. 1, including both printing and scanning functions. A first test taker may take a test administered through endpoint 510, whereas a second test taker may take a test administered through endpoint 520. First and second test takers may take the same or different test at the same or a different time. Server 500 may communicate with endpoints 510, 520 at the same or a different time.

Test administrator 540 may also be connected to the server 500 over the network 530. Tests, scanned tests, and results may be transmitted between the server 500 and the test administrator 540 before, during or after the testing session. The test administrator 540 may be responsible for the development, administration or grading of a test. In one embodiment, the test administrator 540 is connected to the server over a separate network different from the network 530 that connects the server 500 and the endpoints 510, 520.

Figure 6:
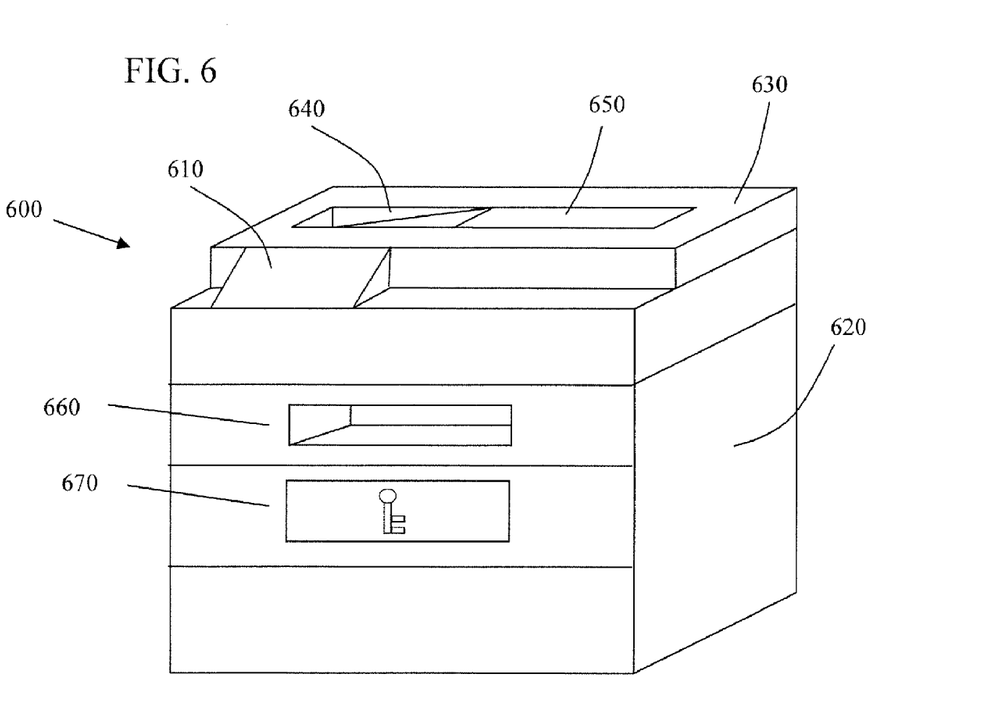
FIG. 6 illustrates an example multifunction peripheral including a printer and a scanner.

FIG. 6 illustrates an example multifunction peripheral 600 including an integrated printer 620 and scanner 630. The multifunctional peripheral 600 is an example embodiment of the peripheral 10, shown in FIG. 1. The printer 620 and scanner 630 are shown included in the same physical housing as the multifunction peripheral 600. A control panel 610 may be used to enter a log-in, a password, the user identification 30, registration code 70 or secure key 80 further described with respect to FIG. 2. The control panel 610 may be used to communicate with or between processors 15 and 25 of FIG. 1.

Printer 620 is shown as including two print chambers 660, 670. Print chamber 660 may be unsecured, and be used to hold or print out the test 40 of FIG. 1. Print chamber 670 may be a holding device or secure document output chamber, used to store the printed result 60. Print chamber 670 may include a shredder. Scanner 630 may include a document feeder 640 and a scanning surface or platen 650 for scanning individual pages, an identification card, a finger print, or a hand print, for example.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. A system for administering a computer and paper-based test comprising:
a multifunction peripheral device comprising an integrated printer and scanner contained in a same housing as the multifunctional peripheral device, wherein the multifunction peripheral device is remotely connected to a host over a network, and wherein the multifunction peripheral device is configured to:
scan an identification of a test taker;
transmit the scanned identification to the host;
receive a registration code from the host in response to transmitting the scanned identification, wherein the registration code identifies the test taker and a test;
select the test corresponding to the registration code;
print out the test including questions on paper;
scan a modified version of the printed test including both the questions and answers to the questions;
detect if the modified version includes constructed responses, wherein the scanned copy of the modified version of the printed test is automatically sent to a central testing facility for human evaluation if the answers comprise the constructed responses, else automatically evaluate the scanned modified version of the printed test;
automatically store the modified version of the printed test in a locked compartment of the multifunction peripheral device, wherein the modified version of the paper test is stored in the locked compartment multifunction peripheral device after the modified version of the paper test is scanned;
transmit the scanned copy of the modified test to the host;
receive a result of an evaluation of the modified test from the host;
verify the result of the evaluation is accurate, wherein verifying an accuracy of the result of the evaluation is based in part on a comparison of a data size of the scanned modified test to determine image quality; and
responsive to verifying the result of the evaluation is accurate, destroy the modified version of the paper test.

2. The system according to claim 1 wherein the scanned identification includes an identification card.

3. The system of claim 1 wherein the scanned identification includes biometric identification of the test taker.

4. The system of claim 3 wherein the biometric identification includes a fingerprint, handprint, retinal scan, or voice scan.

5. The system of claim 1 wherein the registration code is transmitted with the scanned copy of the modified test to the host, and wherein the registration code determines where the scanned copy of the modified test is evaluated.

6. The system of claim 1 wherein the registration code identifies the selected test, the test taker, and a test site where the multifunction peripheral device is located.

7. The system of claim 1 wherein the accuracy of the result of the evaluation is verified by evaluating a transmission quality of the scanned copy of the modified test.

8. A method for administering a test comprising:
transmitting a registration code;
receiving a print job including a test associated with the first registration code in response to transmitting the first registration code;
printing the test for a test session, wherein the test is a paper test printed by a multifunctional peripheral device;
digitizing a modified version of the paper test, wherein the modified version of the paper test is digitized by the multifunctional peripheral device;
automatically storing a paper copy of the modified version of the paper test in a locked document chamber of the multifunctional peripheral device, wherein the paper copy is stored after digitizing the modified version of the paper test;
detecting if the modified version includes constructed responses, wherein the digitized test is automatically sent to a central testing facility for human evaluation if one or more answers comprise the constructed responses, else automatically transmitting the digitized test from the multifunctional peripheral device for onsite evaluation to obtain a test result;
receiving the test result in response to transmitting the digitized test, wherein the test result is received by the multifunctional peripheral device;
automatically comparing the test result with the modified version of the paper test to determine an accuracy of the test result, wherein the accuracy of the test result is determined by comparing a data size of the digitized test; and
destroying the stored paper copy of the modified test in the locked document chamber if the test result is accurate.

9. The method according to claim 8 further comprising:
releasing the print job after printing the test;
reprinting the print job when a second registration code is received, wherein the print job is reprinted without clearing the print job from a data storage of the multifunctional peripheral device; and
clearing the print job from the data storage so the test cannot be reprinted, wherein the first and second registration codes identify two different test takers.

10. The method of claim 8, further comprising:
digitizing an identification of a test taker, wherein digitizing the identification comprises scanning an identification card of the test taker;
transmitting the identification; and
receiving an authentication acknowledgment in response to transmitting the identification, wherein the authentication acknowledgement is used to obtain the registration code.

11. The method of claim 8 wherein the test result is compared by evaluating a transmission quality of the digitized test.

12. The method of claim 8 wherein the multifunctional peripheral device comprises a shredder for destroying the stored paper copy of the modified test.

13. A multifunctional peripheral device, comprising:
a housing;
means for transmitting an identification of a test taker to a host, wherein a registration code is received from the host in response to transmitting the identification, and wherein the registration code identifies a test;
means for printing out the test including questions, wherein the means for printing is contained within the housing;
means for scanning a modified version of the printed test including both the questions and answers to the questions, wherein the scanned test is transmitted to the host, and wherein the means for scanning is contained within the housing;
means for automatically storing the modified version of the printed test in a locked compartment of the housing;
means for detecting if the scanned modified version of the test includes constructed responses, wherein the scanned modified version of the test is automatically sent to a central testing facility for human evaluation if the answers comprise the constructed responses, else automatically transmitting the scanned modified version of the test from the multifunctional peripheral device for onsite evaluation to obtain a test result;

means for receiving the test result in response to transmitting the scanned test, wherein the test result, is received by the multifunctional peripheral device;

means for automatically comparing the test result with the scanned modified version of the printed test to determine an accuracy of the test result, wherein the accuracy of the test result is determined by comparing a data size of the scanned test; and means for destroying a stored paper copy of the scanned modified version of the test in the locked document chamber if the test result is accurate.

* * * * *

UNITED STATES PATENT AND TRADEMARK OFFICE
CERTIFICATE OF CORRECTION

PATENT NO. : 7,831,195 B2
APPLICATION NO. : 11/609305
DATED : November 9, 2010
INVENTOR(S) : Borchers Page 1 of 1

It is certified that error appears in the above-identified patent and that said Letters Patent is hereby corrected as shown below:

At column 9, line 29, please replace "compartment" with --compartment of the--.
At column 9, line 59, please replace "a registration" with --a first registration--.
At column 11, line 5, please replace "result," with --result--.

Signed and Sealed this
Tenth Day of April, 2012

David J. Kappos
*Director of the United States Patent and Trademark Office*